US010066756B2

(12) United States Patent
Sohn

(10) Patent No.: US 10,066,756 B2
(45) Date of Patent: Sep. 4, 2018

(54) DRIVE DEVICE AND METHOD FOR CONTROLLING THE DRIVE DEVICE FOR THE GENERATION OF AN ACTUATION MOVEMENT

(71) Applicant: OTTO EGELHOF GMBH & CO. KG, Fellbach (DE)

(72) Inventor: Juergen Sohn, Esslingen (DE)

(73) Assignee: OTTO EGELHOF GMBH & CO. KG, Fellbach (DE)

( * ) Notice: Subject to any disclaimer, the term of this patent is extended or adjusted under 35 U.S.C. 154(b) by 90 days.

(21) Appl. No.: 14/899,456

(22) PCT Filed: May 28, 2014

(86) PCT No.: PCT/EP2014/061099
§ 371 (c)(1),
(2) Date: Dec. 17, 2015

(87) PCT Pub. No.: WO2014/202369
PCT Pub. Date: Dec. 24, 2014

(65) Prior Publication Data
US 2016/0153575 A1    Jun. 2, 2016

(30) Foreign Application Priority Data

Jun. 17, 2013    (DE) .................. 10 2013 010 027

(51) Int. Cl.
*F16K 31/02* (2006.01)
*F16K 31/00* (2006.01)
*F03G 7/06* (2006.01)

(52) U.S. Cl.
CPC ............ *F16K 31/025* (2013.01); *F03G 7/065* (2013.01); *F16K 31/002* (2013.01)

(58) Field of Classification Search
CPC ....... F16K 31/002; F16K 31/025; F03G 7/065
(Continued)

(56) References Cited

U.S. PATENT DOCUMENTS

| 3,755,876 | A | * | 9/1973 | Beasley | .................. | B23C 3/056 |
| | | | | | | 156/94 |
| 4,503,878 | A | * | 3/1985 | Taylor | ..................... | F16K 25/04 |
| | | | | | | 137/315.02 |
| 4,973,024 | A | * | 11/1990 | Homma | ................ | F16K 31/002 |
| | | | | | | 137/594 |

(Continued)

FOREIGN PATENT DOCUMENTS

DE        4322731 A1    1/1995
DE    102006006241 A1    8/2007
(Continued)

*Primary Examiner* — Umashankar Venkatesan
(74) *Attorney, Agent, or Firm* — Kriegsman & Kriegsman

(57) ABSTRACT

Drive device and a method for controlling the drive device so as to produce an actuation movement. The drive device includes at least one actuation element (25) consisting of a shape memory alloy, and at least one return actuation element (21) which counteracts the actuation movement of the at least one actuation element (25), the at least one actuation element (25) being received between two connection elements (17) that are separated from, and associated with, one another, and engaging with or being secured to each connection element (17), the connection elements (17) being kept at a distance from one another by the at least one actuation element (25) and the at least one return actuation element (21) positioned between them (17) and, as a result of the opposing directions of action thereof, the connection elements (17) being positioned in a defined initial length for controlling an actuation movement.

16 Claims, 3 Drawing Sheets

Figure 1:
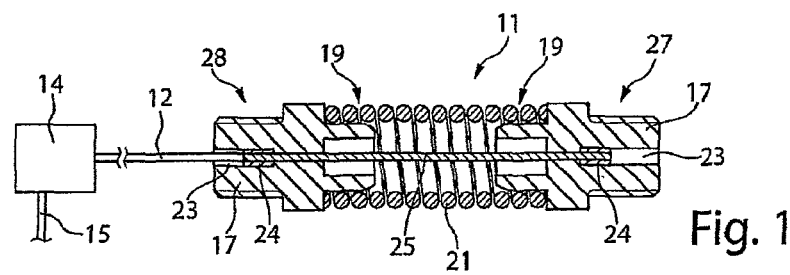

(58) Field of Classification Search
USPC .................................................. 251/129.06
See application file for complete search history.

(56) References Cited

U.S. PATENT DOCUMENTS

| | | | | |
|---|---|---|---|---|
| 5,211,371 | A * | 5/1993 | Coffee | F16K 31/002 251/11 |
| 5,816,306 | A * | 10/1998 | Giacomel | E06B 9/368 160/176.1 P |
| 6,762,515 | B2 | 7/2004 | Gummin et al. | |
| 7,055,793 | B2 * | 6/2006 | Biehl | F16K 31/002 251/11 |
| 7,469,878 | B1 * | 12/2008 | Richard | F16K 31/0651 251/129.06 |
| 7,815,161 | B2 * | 10/2010 | Saitoh | F16K 31/025 251/11 |
| 8,616,237 | B2 * | 12/2013 | Jansen | F15B 13/0405 137/613 |
| 2011/0315903 | A1 * | 12/2011 | Sohn | F16K 31/025 251/11 |
| 2012/0199763 | A1 * | 8/2012 | Lind | F16K 31/025 251/11 |
| 2012/0203358 | A1 * | 8/2012 | Lind | B25J 15/0009 623/26 |
| 2013/0111896 | A1 * | 5/2013 | Foshansky | F03G 7/065 60/527 |
| 2015/0028234 | A1 * | 1/2015 | Kraus | F03G 7/065 251/11 |

FOREIGN PATENT DOCUMENTS

| | | |
|---|---|---|
| DE | 102006037650 A1 | 8/2007 |
| DE | 102008021444 A1 | 11/2009 |
| DE | 102008054900 A1 | 7/2010 |
| DE | 102012212686 A1 | 1/2014 |
| EP | 0841510 A1 | 5/1998 |
| EP | 1619287 A1 | 1/2006 |
| JP | H0229378 U | 2/1990 |

* cited by examiner

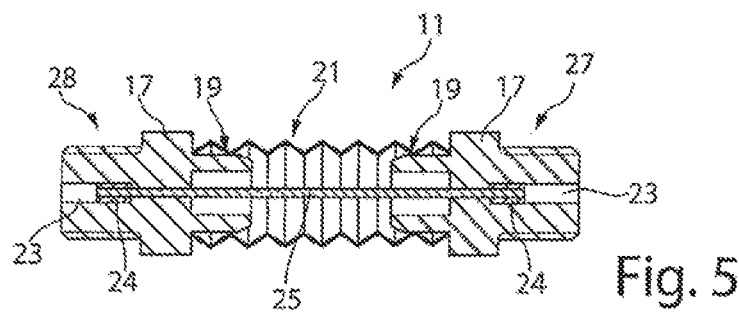
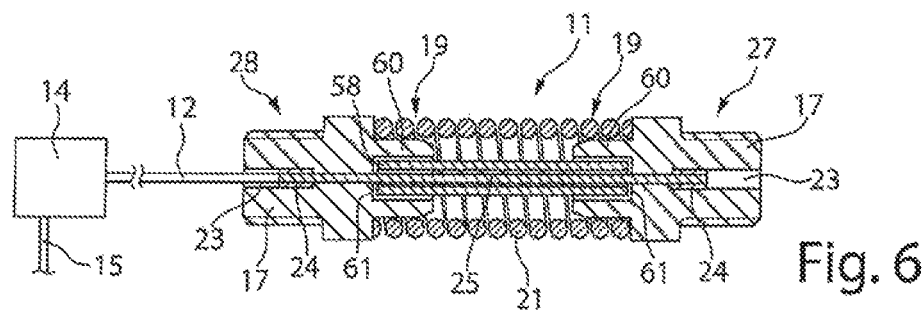
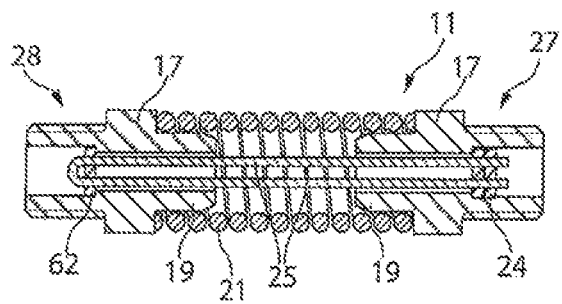

DRIVE DEVICE AND METHOD FOR CONTROLLING THE DRIVE DEVICE FOR THE GENERATION OF AN ACTUATION MOVEMENT

The invention relates to a drive device for the generation of an actuation movement and a method for controlling such a drive device.

A linear movement actuator is known from DE 10 2006 037 650 A1, which comprises at least one actuation element that is able to be moved against the action of a spring element. An actuating member can thereby be controlled, wherein the actuating member is held in a home position by the influence of the force of the spring element and the force of the spring element acting on the actuating member is provided to be smaller than an actuation force of the at least one actuation element, said actuation element being formed from a memory shape alloy. In this embodiment, provision is made for the spring element to be formed as part of a carrier device on which the actuating member is provided.

Such linear movement actuators have proved to be expedient in use; however, the application and usage cases are, due to their construction, limited.

A further linear movement actuator is known from DE 10 2006 006 241 A1, in which a housing having an actuating member is provided, which is positioned with a spring element in a home position, wherein the actuating member adjoins a base plate. To control the actuation path, an actuation element made from a memory shape alloy is provided, wherein unlocking of a catch or holding device takes place for the activation of the actuation elements.

Furthermore, an actuator having at least two actuation elements is known from DE 10 2008 021 444 A1, wherein an SMA wire is integrated on each actuation element. This actuator is arranged in a guide with its actuation element perpendicular to a base plate and is able to move along the guide in order to close a valve opening.

An actuator having actuation elements made from a shape memory alloy are known from U.S. Pat. No. 6,762,515 B1, which is constructed to be cascade-like, such that an actuation movement of a first SMA wire influences a first actuating member, in which a second SMA wire is fastened which in turn influences a second actuating member, etc. Thus a repeated translation for an enlarged stroke is created.

A valve in a pressure chamber is known from DE 10 2012 212 868 A1, which has two valve closing members that close an opening in the pressure chamber reciprocally depending on the control of an SMA wire and the resetting movement of a spring element, while at the same time releasing the other, and vice versa.

The above exemplary embodiments require a specific adaptation in the construction and arrangement for application.

The object of the invention is to propose a drive device and a method for controlling the drive device which is able to be used diversely and is able to be constructed modularly.

This object is solved by a drive unit for the generation of an actuation movement, wherein the at least one actuation element is received between two connection elements that are arranged separately from each other and with spacing apart from each other, and engaging with or being fastened to each connection element, wherein the connection elements are spaced apart from one another by the at least one actuation element and the at least one resetting element positioned between the connection elements and, as a result of the opposing directions of action thereof, the connection elements are positioned in a defined starting position for controlling an actuation movement. Due to this arrangement of the connection elements, the at least one actuation element and the at least one resetting element, the drive device can adopt a home position or a standardised installation size. Also, after control or activation of the drive device, this automatically reverts to the starting position with the predetermined starting length. This drive device is also able to be used in a versatile manner by a further component, connection piece, carrier element or suchlike being fastened to the respective connection element.

The connection elements, the at least one actuation element and the at least one resetting element are preferably formed as a manageable module. Due to the arrangement of the actuation element and the resetting element between the connection pieces and the opposing directions of action thereof, these individual components can be held together automatically as an assembly or a module, such that a pre-installation of such a module is possible and the module composed of these components exists as an operational unit.

A further preferred embodiment of the invention provides that an electrical connection line is able to be connected to the at least one actuation element, said connection line preferably being connected to a control device.

An electrical connection line is preferably able to be connected to the at least one actuation element, which is in particular able to be connected to a control device. Thus, both an active control of the at least one actuation element for the generation of an actuation movement is achieved by means of the connectible control device via the connection line, as well as a sensor function being provided which is in turn able to be registered by the control device. By means of to the connection line that is able to be connected to the actuation element, the drive device may also be used without a connection line as the sensor and/or actuation element, which is activated and actuated depending on an ambient temperature acting on the actuation element.

Provision is preferably made for the at least one actuation element and the at least one resetting element to be positioned coaxially relative to one another and to each engage with a connection element. A space-saving and compact arrangement can thereby be created.

Furthermore, provision is preferably made for the resetting element to be designed as a spring element or bellows element. Thus a simple and cost-effective design as well as a simple receipt by means of the connections elements can be enabled.

Furthermore, the actuation element can be held in a through bore of the connection element with a clamping element. This enables simple fixing. The connection element preferably has a longitudinal slot which leads to the through bore, such that a simple use of the actuation element on both connections elements is enabled. An installation without an additional tool can therefore take place. Due to the resetting element arranged therebetween, the components of the drive device, so the connection elements, the actuation element with the clamping elements arranged thereon and the resetting spring, are held with arrangement relative to one another in a fixed starting position.

One end of the actuation element can preferably be redirected by a clamping element or a pin in a connection element, such that two ends of the actuation element are fastened by the clamping element in an opposite connection element. Doubling of the actuation force can thereby be achieved. It is also possible to provide a multiple redirection which runs in a pulley-shaped manner between the connection elements.

The at least one actuation element made from a memory shape alloy is preferably formed as an elongated wire. This represents a very simple embodiment. Alternatively, the actuation element may also be formed as a tube or as a spiral spring element.

The actuation element is preferably surrounded by a cover. Improved response behaviour of the actuation element can thereby be achieved.

A further alternative embodiment of the invention provides that a heating element, in particular a PTC element, is provided on the connection element, which extends towards the opposite connection element and is surrounded by a spiral actuation element. This embodiment can be particularly suitable for further use cases.

The at least one connection element preferably comprises an installation and/or sealed section. Connections for fast incorporation of the respective use purpose are thereby enabled.

According to a further alternative embodiment of the invention, provision is made for at least two actuation elements to be provided, which have the same or different operating ranges or switching temperatures. If the operating ranges of the actuation elements are different, a multi-stage regulation or control can be provided. In the case of several actuation elements with the same operating ranges, strengthening of the force or path can take place.

The actuation movement of the at least one actuation element can be controlled with the control device. A two-point regulation or a proportional regulation can, for example, thereby take place. A defined control of the actuation element can be enabled by a corresponding current feed, whereby a positional determination of the moving connection element can also be provided at the same time by the control device. The actuation movement of the actuation element can thus be controlled and monitored.

Provision can alternatively be made for an electrical resistance of the at least one actuation element to be able to be registered by the control device. For example, a diagnosis regarding the fatigue state of the actuation element or an actual value of the medium temperature surrounding the actuation element can thereby also be registered and evaluated. Such a registering of data can take place for control diagnosis or documentation purposes.

The object of the invention is furthermore solved by a method for controlling the drive device, in which a resistance of the at least one actuation is registered by the control device and/or the at least one actuation element is fed by a current with the control device for the generation of an actuation movement on the control device. Thus, the drive device is possible as both an actuator for the generation of an actuation movement and as a sensor for the registering of the operating state of the actuation element, wherein the sensory function is provided for documentation purposes in particular for the evaluation and/or monitoring of the actuation movement and/or the state of the at least one actuation element.

The drive device for the generation of an actuation movement according to the invention is provided as a drive for a switching valve for liquid or gaseous media, wherein a valve closing member is able to be arranged on a connection element of the drive device, said member opening and closing a valve seat on a passage opening in a valve housing. An actuation movement of the valve closing member for opening and closing the valve seat is able to be controlled by the actuation element, said actuation movement being caused by the temperature of the medium, such that this switching valve is either open or closed. Furthermore, with such a drive device, a targeted opening and closing can be provided at a preset switching point. Provided that a control device is connected to the drive control, the opening and closing movement can be controllable in such a way that a continuous, degressive or progressive release of the passage opening is enabled on the valve seat.

For the switching valve, provision is preferably made for the drive device to be provided in a sleeve-like housing which is preferably able to be connected fixedly to a connection element. A simple installation of the drive relative to the valve housing can thereby be enabled.

The switching valve preferably has a sealing element on one end of the sleeve-like housing opposite the valve, said sealing element sealing the sleeve-like end with media-tightness and guiding a connection line to the outside. A constructively simple construction with a sealing end of the housing on which the drive device is provided can thereby be formed. At the same time, the connection line for controlling the at least one actuation element can be guided out in a simple manner and connected to a control device.

The sleeve-like housing in which the drive device is received is preferably formed as a screw-in element, such that this is able to be inserted into the valve housing. A fast completion of such a switching valve can thereby be enabled.

Provision is preferably made for a valve seat element to be able to be inserted in a passage opening in the valve housing. A variable adaptation to different usage cases of the switching valve can thereby be enabled by the valve seat, which is able to be inserted into the valve housing, and the valve closing member, which is provided exchangeably with a connection element, being selected.

The switching valve can preferably be used as an expansion valve in air conditioning circuits. In particular, this switching valve can be used as a directly switching, electrically activated expansion valve in air conditioning circuits.

The switching valve according to the invention can alternatively be used as a thermostat valve in air conditioning circuits or heating circuits. Such a switching valve can, particularly in stationary heating circuits, be used for regulating, safety or bypass circuitry.

Moreover, in transmission stations such as those in hot water heating, the switching valve can be employed by a heating circuit. The switching valve can furthermore be used in drinking water systems, for example for legionella control or disinfection circuitry.

Figure 2:
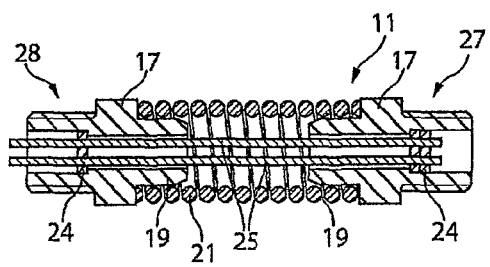
Figure 3:
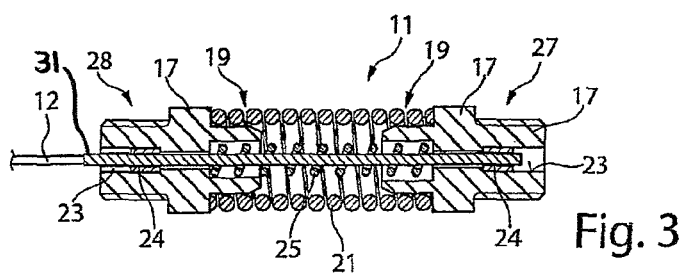
Figure 4:
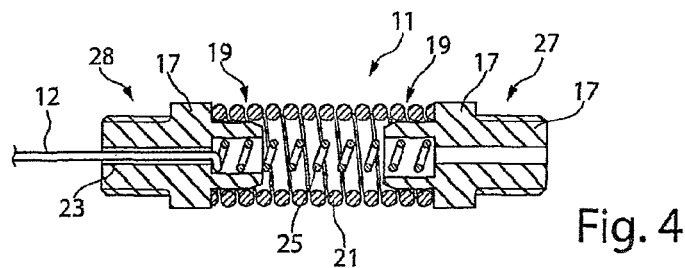
Figure 8:
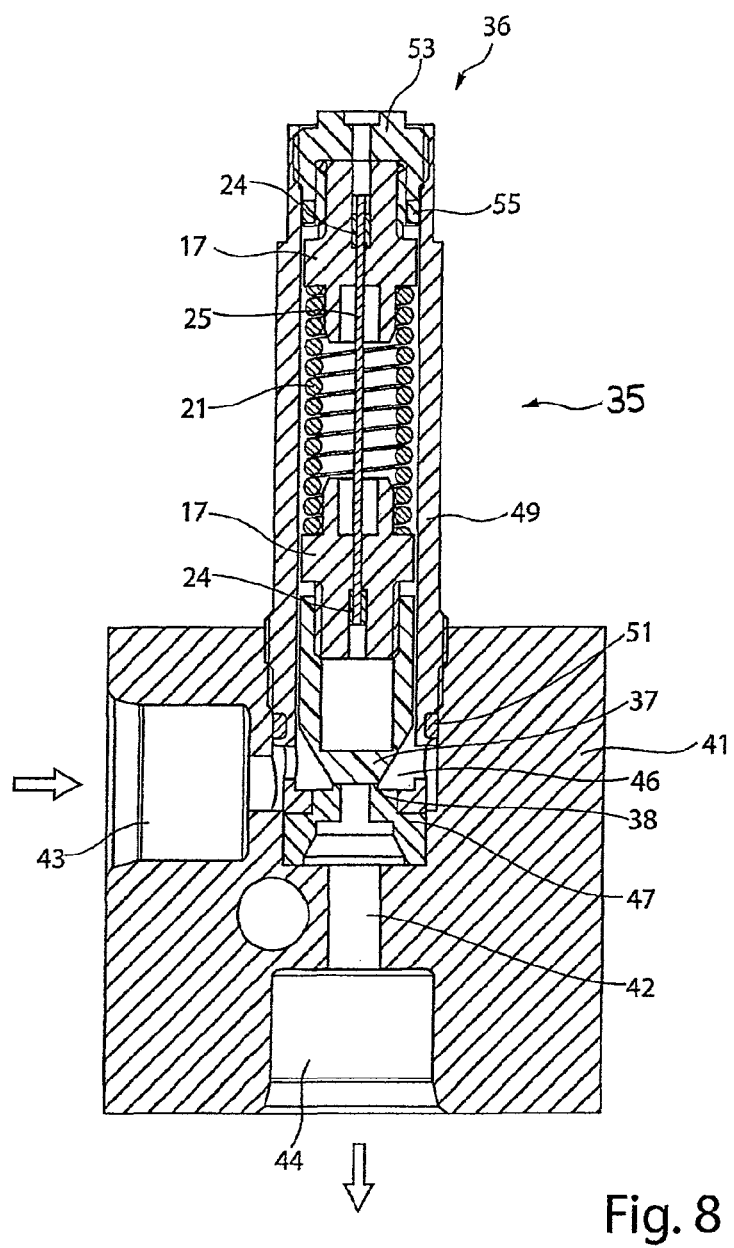

The invention and further advantageous embodiments and developments of the same are described and illustrated below with the aid of the examples depicted in the drawings. The features to be gleaned from the description and the drawings may be applied according to the invention individually or as a multiplicity in any combination. Shown are:

FIG. 1 a schematic sectional view of the drive device according to the invention, FIG. 2 a schematic sectional view of an alternative embodiment to FIG. 1, FIG. 3 a schematic sectional view of a further alternative embodiment to FIG. 1, FIG. 4 a schematic sectional view of a further alternative embodiment to FIG. 3, FIG. 5 a schematic sectional view of a further alternative embodiment to FIG. 1, FIG. 6 a schematic sectional view of a further alternative embodiment to FIG. 1, FIG. 7 a schematic sectional view of a further alternative embodiment to FIG. 2, and FIG. 8 a schematic sectional depiction of the drive device in application as a switching valve.

A sectional depiction of a drive device 11 is shown schematically in FIG. 1, said drive device being able to be connected to a control device 14 via a connection line 12. For this, a plug connection or a terminal strip or suchlike can be provided. The control device 14 can be supplied with electricity via a line 15 and/or connected to further data processing devices such as evaluation devices, diagnostic devices or suchlike.

The drive device 11 comprises two connection elements 17 which are arranged separately from each other. The connection elements 17 are advantageously designed cylindrically and have a first connecting section 19 for receiving a resetting element 21, said resetting element being designed, according to a first embodiment, as a spiral spring. The first connecting section 19 forms, for the respective ends of the resetting element 21, a receiver and at least one at least slight guide.

The connection elements 17 each have a central, preferably tiered, through bore 23. An actuation element 25 is held fixedly in the through bores 23 of the connection elements 17 by means of clamping elements 24. The spacing between the connection elements 17 can be determined or adjusted by the clamping elements 24, wherein the connection elements 17 are held at a distance due to the resetting element 21 and thus the actuation element 25 is held under at least slight tension. In this embodiment, the resetting element 21 is configured as a pressure spring. The connection elements 17 advantageously have a longitudinal slot which extends from the outer periphery of the connection element 17 up to the through bore 23. Therefore, the clamping elements 24 can be fixed thereon in a simple manner before the integration of the actuation element 25, wherein a simple installation of the components relative to one another is then enabled. For example, a clamping element 24 is inserted into a connection element 17, such that this engages with the tiered through bore 23. Then the resetting element 21 is applied to the connection element 17 before the opposite connection element 17 is positioned relative to the resetting element 21 and the opposite end of the actuation element 24 is inserted into the through bore 23 of the connection element 17 via its longitudinal groove. Due to such a construction and arrangement, after the assembly of the components, the drive device 11 is formed as a manageable module or as a standalone assembly.

The actuation element 25 consists of a memory shape alloy (for example an NiTi alloy, a Cu- or Fe-based alloy or memory plastic). Depending on the usage case, different operating points or switching temperatures can be set. In the first exemplary embodiment, the actuation element 25 is designed as a wire.

One connection element 17 or the right-hand connection element 17 has an installation section 27 on which, for example, a valve closing member or other components are able to be fastened. The opposite connection element 17 has an installation section and/or a sealed section 28 in order to receive the drive device 11 in a further housing or housing section or to fasten said drive device to an installation site.

In this embodiment, the resetting element 21 coaxially surrounds the actuation element 25, such that a cylindrical construction of the drive device 11 is provided. The connection elements 17 may be formed from plastic or metal.

Alternatively, provision can furthermore be made for the resetting element 21 to also be formed from a memory shape alloy.

The connection line 12 is able to be connected to one end of the actuation element 25. The drive device 11 can control the actuation element by means of the control device 14 by the actuation element 25 being fed with a current. The actuation element 25 thereby contracts, such that both connection elements 17 are moved towards each other or, if one of the two connection elements 17 is tightly clamped, the opposite one is actively moved towards the fixed or tightly clamped connection element 17. As soon as a current feed is switched off by the control device 14, a resetting of the drive device 11 is undertaken by the resetting element 21, the compressive force of which then prevails.

Provision can alternatively be made for the actuation element 25 to be surrounded by a gaseous or liquid medium and to be controlled by the temperature thereof. As soon as the temperature of the gaseous or liquid medium is exceeded, this leads to an actuation movement of the one connection element 17. If the actuation element 25 is activated and a control device 14 is connected, a change in resistance can be registered by the control device 14 in order to register this state of the actuation element 25 in this way. At the same time, an evaluation of the drive device 11 can thereby be provided. In this case, the drive device 11 may be used for thermal regulation. In addition, yet another active control takes place via the control device 14 for the purpose of registering the temperature of the liquid or gaseous medium.

An alternative embodiment to FIG. 1 is depicted in FIG. 2. This embodiment differs from FIG. 1 to the extent that, instead of an actuation element 25 arranged centrally in the drive device 11, two actuation elements 25 are provided. These can be structurally identical. Provision is preferably made for these to have different switching points from each other, such that a two-stage actuation movement of the drive device 11 is able to be controlled by means of the control device 14.

In this embodiment according to FIG. 2, an active two-point regulation or even a proportional regulation by means of a corresponding regulatory algorithm can be provided by means of the control device 14.

It is understood that, as an alternative to two actuation elements 25, several actuation elements having the same or different switching points are also able to be present.

A further alternative embodiment to FIG. 1 is depicted in FIG. 3. This embodiment differs by a heating element 31 being provided instead of the centrally arranged actuation element 25, on which heating element the connection elements 17 are provided moveably. The connection elements 17 are held by clamping elements 24 analogously to FIG. 1. The actuation element 25 is formed to be spiral-shaped and surrounds the heating element 31. In this embodiment, the resetting element 21 is designed as a tension spring and positions both connection elements 17 in a starting position when the actuation element 25 is not heated. Due to the spiral-shaped design of the actuation element, a lifting movement takes place during heating of the actuation element 25, i.e. the actuation element 25 acts as a pressure spring in order to push the connection elements 17 apart until, for example, both connection elements 17 are positioned in an end position due to the position of the clamping elements 24, as is depicted in FIG. 3. A starting position of the connection elements 17 is controlled by the resetting element 21. A PTC element is preferably provided as the heating element 31.

An alternative embodiment to FIG. 3 is depicted in FIG. 4. This embodiment differs from the one in FIG. 3 to the extent that the actuation element 25 is directly fed with a current. A heating element 31 is not provided. In this embodiment, the resetting element 21 is also designed as a tension spring since, when a current is being fed in, a compressive force is exerted on the connections elements 17 by the actuation element 25. In order for the drive device 11 to be formed as a manageable module, the connection pieces 17 are fixedly connected to the respective ends of the resetting element 21. This can, for example, take place by screwing, adhering, clamping or suchlike. A further alternative embodiment to FIG. 1 is depicted in FIG. 5. This embodiment differs from the one in FIG. 1 to the extent that the resetting element 21 is designed as a bellows element rather than a spiral spring. Such a bellows element can completely shield the actuation element 25 from the environment. Alternatively, the bellows element can also have breaks, such that a gaseous or liquid medium is able to be flow through the bellows element.

An alternative embodiment to FIG. 1 is depicted in FIG. 6. This embodiment only differs by the actuation element 17 being surrounded by a cover 58 that extends between the two connection elements 17. An annular collar 60 is advantageously provided on each connection element 17, with which a pot-shaped receiving region is created. By means of the resetting element 19 which is designed as a pressure spring, the connection elements 17 are positioned with maximum spacing, said spacing being determined by the length of the actuation element 25 or the clamping elements 24 engaging therewith. The length of the cover 58 is shorter than a length of the actuation element 25 between the respective front faces 61 of the connection elements 17 in a state of the actuation element 25 where current is being fed. In the current-fed or activated state of the actuation element 25, its length is shortened. The cover 58 can, for example, be formed from a thermoplastic plastic or an elastomer, wherein its inner diameter is greater than the outer diameter of the actuation element 25, such that an insulating layer can be formed between the actuation element 25 and the cover 58. This insulating layer is dependent on the medium used. This can be water, oil, gel, refrigerant, coolant or suchlike.

An alternative embodiment to FIG. 2 is depicted in FIG. 7. In this embodiment, a redirection element 62, for example a pin, is, for example, provided on the left-hand connection element 17, said redirection element enabling the redirection of the actuation element 25, such that two actuation elements 25 arranged between the connection elements 17 are able to be controlled with an electrical connection. Alternatively, a redirection of an actuation element 25 can also take place on each connection element 17 and/or a multiple redirection can be provided.

A schematic sectional view of a switching valve 35 is depicted in FIG. 8, in which a drive 36 for controlling an opening and closing movement of a valve closing member 37 relative to a valve seat 38 takes place with the drive device 11, for example according to FIG. 1. This exemplary embodiment is a so-called NC (normally closed) switching valve. The further embodiments of the drive device 11 may also be provided.

This switching valve 35 comprises a housing 41 having a passage opening 42 that connects a supply opening 43 to an outlet opening 44. The supply opening 43 and outlet opening 44 are designed as connections for the installation of connection lines or a piping system. The passage opening 42 has a regulating space 46 in which, for example, a valve seat element 47 having the valve seat 38 is able to be used. Alternatively, the valve seat 38 can be provided directly on the housing 41. In this posited embodiment, it is enabled that the valve seat elements 47 comprise through bores of different sizes, such that a corresponding adaptation to the mass flow of the liquid or gaseous medium that is to be regulated is thereby enabled. The drive 36 is preferably designed as an integration cartridge and can be inserted at least partially into the regulating space 46. This advantageously has a sleeve-like housing 49 which is able to be screwed together with the regulating space 46, wherein a seal 51 is preferably located therebetween in order to seal off the drive 36 from the housing 41. The drive device 11 is provided within the sleeve-like housing 49. The valve closing member 37 is fastened to a connection element 17 facing the valve seat 38. This can, for example, be formed by screwing, pressing or suchlike. Opposite this, a locking element 53 engages with the second connection element 17, said locking element fixedly receiving the connection element 17 on one side and, on the other side, tightly sealing off the sleeve-like housing 49. A further seal 55 is advantageously provided.

According to a first embodiment, provision can be made for this switching valve 36 to be designed as a thermostat valve. As soon as the medium lying on the supply opening 43 and in the regulating space 46 exceeds a switching temperature of the actuation element 25, the actuation element 25 is activated. The actuation force of the actuation element 25 is greater than the resetting force of the resetting element 21. The valve closing member 37 is thereby lifted from valve seat 38 and the mass flow can arrive at the outlet opening 44 and thus pass into the circuit. As soon as the temperature of the medium in the regulating space 46 and on the actuation element 25 drops, a closing movement of the valve closing member 37 is initiated.

Such an exemplary embodiment of a switching valve may also be formed as a safety switching valve.

Alternatively, the switching valve 35 according to FIG. 8 can be provided with a connection line 12, such that the actuation movement of the valve closing member 37 can be targeted or additionally controlled via a control device 14 by feeding the actuation element 25 with a current, and/or the actuation element can be scanned as a sensor. With such a control, a directly switching, electrically activated expansion valve in air conditioning circuits can, for example, be formed. This embodiment as an expansion valve may also be used with a combined switching valve in air conditioning circuits. Such a switching valve may furthermore be used as a regulating or bypass valve and controlled targetedly.

Furthermore, with such a switching valve 35 having a control device 14, monitoring of the switching time for an opening or closing of the valve can be registered and monitored.

This embodiment of the switching valve 35, which is electrically controllable, has the advantage over conventional expansion valves that these operate noiselessly and may moreover have a small structural size. Furthermore, no electromagnetic drive is required. Moreover, a motion drive such as a thermal head with gas charge can also be dispensed with.

All aforementioned features are essential to the invention in of themselves and may be combined with one another in any way.

The invention claimed is:

1. Drive device for the generation of an actuation movement, having at least one actuation element made from a memory shape alloy, having at least one resetting element which counteracts the actuation movement of the at least one actuation element, the at least one actuation element is received between two connection elements that are arranged separately from each other and with spacing apart from each other and engages with or is fastened to each connection element, each connection element comprises a connection section as a receiver for the resetting element and comprises an installation section opposite to the connection section, the connection elements are held at a distance by the at least one actuation element and the at least one resetting element, which are positioned between connection sections of the connection elements, and, as a result of the opposing directions of action thereof, the connection elements are positioned in a defined starting position for controlling an actuation movement, the actuation element is held with a clamping element in a through bore of the connection element or is at least simply redirected, wherein the at least one actuation element and the at least one resetting element are positioned coaxially relative to each other and each engage with the connection elements, and the connection elements, the at least one actuation element and the at least one resetting element are formed as an assembly.

2. Drive device according to claim 1, wherein an electrical connection line is connectable to the at least one actuation element.

3. Drive device according to claim 1, wherein the resetting element is designed as a spring element or bellows element.

4. Drive device according to claim 1, wherein the actuation element is formed as an elongated wire, as a tube or as a spiral spring element.

5. Drive device according to claim 1, wherein a heating element is provided on a connection element, said heating element extending in the direction of the opposite connection element and being surrounded at least by a spiral-shaped actuation element.

6. Drive device according to claim 1, wherein at least two actuation elements are provided, which have different operating ranges or switching points.

7. Drive device according to claim 1, wherein an actuation movement of the at least one actuation element is controlled with the control device.

8. Drive device according to claim 1, wherein an electrical resistance of the at least one actuation element is registered with the control device.

9. Method for controlling the drive device according to claim 1, wherein at least an electrical resistance of the actuation element is registered on a control device or the at least one actuation element is fed with a current by the control device for the generation of an actuation movement, or an actuation movement is controlled by an ambient temperature.

10. Switching valve for liquid or gaseous media, having a housing which has at least one passage opening that connects a supply opening to an outlet opening, having a valve seat arranged in the passage opening, said valve seat being able to be closed by a valve closing member that is controlled with a drive which is arranged on the housing, wherein the drive has a drive device according to claim 1 and the valve closing member is arranged on a connection element of the drive device.

11. Switching valve according to claim 10, wherein the drive device is provided in a sleeve-like housing and is connectable fixedly to a connection element.

12. Switching valve according to claim 10, wherein a locking element is provided on an end opposite the valve closing member, said locking element sealing the sleeve-like housing with media-tightness.

13. Switching valve according to claim 10, wherein a sleeve-like housing of the drive is inserted into the housing as a screw-in element.

14. Switching valve according to claim 10, wherein a valve seat element pointing towards a regulating space is inserted into the passage opening.

15. Switching valve according to claim 10, wherein it is used as an expansion valve in air conditioning circuits, as a thermostat valve for air conditioning circuits or heating circuits, or as a switching valve in drinking water supply systems.

16. Drive device according to claim 1, wherein the actuation element is formed as an elongated wire, as a tube or as a spiral spring element surrounded by a cover.

\* \* \* \* \*